United States Patent
Campbell et al.

(10) Patent No.: US 9,571,993 B2
(45) Date of Patent: *Feb. 14, 2017

(54) METHOD AND SYSTEM FOR DISPLAYING DATA

(71) Applicant: Vibes Media LLC, Chicago, IL (US)

(72) Inventors: Alexander Gates Campbell, Chicago, IL (US); John Joseph Philbin, Chicago, IL (US); Samuel Thomas Benediktson, Chicago, IL (US); Leon Xiaoliang Zhao, Evanston, IL (US); Vincent Borreros Villaruel, Chicago, IL (US)

(73) Assignee: Vibes Media, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,448

(22) Filed: May 27, 2016

(65) Prior Publication Data

US 2016/0277906 A1 Sep. 22, 2016

Related U.S. Application Data

(63) Continuation of application No. 11/113,604, filed on Apr. 25, 2005, now Pat. No. 9,356,712.

(60) Provisional application No. 60/571,376, filed on May 14, 2004.

(51) Int. Cl.
| | |
|---|---|
| *H04W 4/00* | (2009.01) |
| *H04W 4/14* | (2009.01) |
| *H04B 17/23* | (2015.01) |
| *H04L 12/58* | (2006.01) |
| *H04M 1/725* | (2006.01) |

(52) U.S. Cl.
CPC .............. *H04W 4/14* (2013.01); *H04B 17/23* (2015.01); *H04L 51/12* (2013.01); *H04L 51/16* (2013.01); *H04M 1/72552* (2013.01)

(58) Field of Classification Search
CPC .............................. H04W 84/18; H04W 76/02
USPC ........................................ 455/465, 466, 408
See application file for complete search history.

(56) References Cited

U.S. PATENT DOCUMENTS

| | | | |
|---|---|---|---|
| 6,782,510 B1* | 8/2004 | Gross ................... | G06F 17/274 704/10 |
| 2003/0106070 A1* | 6/2003 | Saam .................... | H04N 5/445 725/135 |
| 2005/0044254 A1* | 2/2005 | Smith ................... | G07F 17/305 709/231 |

* cited by examiner

*Primary Examiner* — Chuck Huynh
(74) *Attorney, Agent, or Firm* — Bishop Diehl & Lee, Ltd.

(57) ABSTRACT

A system is disclosing having a portable device, a computer, a network, and a display system. The portable device includes an input means for entering data and a wireless transceiver for transmitting the data and receiving messages. The computer includes an application and a display, the application includes a filter that checks the data against a list of words and indicates on the display if the data contains at least one of the words. The network is operatively connected to the portable device and the computer. The display system is connected to the computer and includes a display screen where the data is automatically displayed on the display screen for a predetermined period of time.

18 Claims, 6 Drawing Sheets

| Incomming Text Messages | Picture Messages | | |
|---|---|---|---|
| Time | Messages | | Mobile Orig |
| 7/21/2004 1:37:24 PM | Put on 99.5 | | |
| 7/20/2004 8:10:21 PM | Mario | | |
| 7/20/2004 1:24:59 PM | Play Love J. Cory**** | Reply to Sender | |
| 7/19/2004 4:12:03 PM | Test | Block Sender | |
| 7/19/2004 11:01:54 PM | Play | Delete | |
| 7/17/2004 11:41:19 PM | L | | |
| 7/16/2004 5:31:18 PM | Play | | |
| 7/161/2004 12:33:01 PM | Hi ben. No computer where I am at today will pag... | | |
| 7/15/2004 4:02:17 PM | Test 2 compaq | | |
| 7/14/2004 3:46:35 PM | Hello | | |
| 7/14/2004 3:37:37 PM | Text 2 screen | | |
| 7/14/2004 3:34:00 PM | Hi again | | |
| 7/14/2004 3:14:23 PM | Yo | | |

FIG. 3

METHOD AND SYSTEM FOR DISPLAYING DATA

CROSS-REFERENCE TO RELATED APPLICATIONS

This application is a continuation of U.S. patent application Ser. No. 11/113,604, titled "METHOD AND SYSTEM FOR DISPLAYING DATA" and filed on Apr. 25, 2005, now U.S. Pat. No. 9,356,712. The '712 patent is hereby incorporated by reference.

TECHNICAL FIELD

The present invention generally relates to displaying data entered by a participant of an event via a portable electronic device, and more specifically, the present invention relates to displaying a text message for others to view on a common display screen wherein the text message is delivered from a portable electronic device in response to an event driven prompt.

BACKGROUND OF THE INVENTION

Involving participants in events, such as contests or other forms of entertainment, can be done in a variety of ways. These can include call-in contests hosted by radio stations to raffles or lotteries based on the selection of a matching ticket or number. However, the methods used to date have only limited appeal and lack substantive interaction between the participants and the event organizers.

Accordingly, event organizers are always looking for intriguing mechanisms to involve the public in the event and to generate further interest by the participants. However, only very limited use, if any, is made of the technology that is virtually accessible to all such participants. In this regard, the present invention takes advantage of the proliferation of portable electronic devices having text messaging and/or photograph sending capabilities, to create an event where the users of such devices can actively participate.

The present invention solves the problems described above as well as other problems.

SUMMARY OF THE INVENTION

One embodiment of the present invention is directed to a system and method for displaying a text message for others to view.

More specifically, the present invention is directed to a system comprising a portable electronic device, a computer, a network for allowing communication between the portable electronic device and the computer, and a display system for displaying a message received by the computer from the portable device. The portable device includes an input means for entering data. This can be in the form, for example, of a text message.

The portable device also includes a wireless transceiver for transmitting the data and receiving messages. The computer includes an application (i.e., a program) and a computer display screen. The application includes a filter that checks the data against a list of words (or uses some other criteria for filtering data received by the computer over the network) and indicates on the computer display screen if the data contains at least one of the words. The filter can also use wildcard characters that stand for one or more characters. The network is operatively connected to the portable device and the computer. The display system is operatively coupled to the computer and includes a second display screen (i.e., distinct from the typical display screen associated with the computer) wherein the filtered data is automatically displayed on the display screen for a predetermined period of time. The system is configured to receive data from a plurality of portable electronic devices that can transmit data over the network, and thus potentially display a data from more than one device on the display system.

In another embodiment of the invention, a system is provided comprising a portable electronic device, a computer, a network, and a display system. The portable device has a camera for entering a photograph and a wireless transceiver for transmitting the photograph and receiving messages. The computer has an application and a computer display screen. The network is operatively connected to the portable device and the computer. Further, the display system is operatively coupled to the computer and has a display screen wherein the photograph is automatically displayed on the display screen for a predetermined period of time.

In yet another embodiment of the invention, a method is provided comprising transmitting data from a portable device comprising an input means for entering the data and a wireless transceiver for transmitting the data and receiving messages. The method further includes filtering the data with a computer comprising an application and a display, the application comprising a filter that checks the data against a list of words or characters containing wildcard characters, and indicates on the display if the data contains at least one of the words, and, transmitting the data from the portable device to the computer via a network operatively connected to the portable device and the computer.

In yet a further embodiment of the invention, a method is provided comprising the steps of entering a photograph via a portable electronic device comprising a camera and a wireless transceiver for transmitting the photograph and receiving messages. The method further includes displaying the photograph on the display of a computer executing an application, transmitting the photograph from the portable device to the computer via a network operatively connected to the portable device and the computer, and displaying the photograph via a separate display system connected to the computer and comprising a display screen.

The disclosed systems and methods can be utilized to allow people to participate in an event, such as a contest, poll, game or other form of entertainment. Each participant can utilize a portable electronic device, such as a cell phone, PDA, laptop computer, etc., to enter a message and/or photo, etc., in response to some prompt or activity involved in the event. For example, a contest can be set up at a location, such as a bar or restaurant, that rewards the $100^{th}$ person to text the word "WIN" to a special number (e.g., a telephone number that is associated with the computer). The winner can be given cash, tickets to another event or any other reward. As each participant sends the text message, the computer filters the messages for the word "WIN" and displays each participant's message having this word (possibly with an indication of the participant's name or last four numbers of their phone number, and rank—e.g., $68^{th}$ response) on the display system. The display system is typically a large screen that is centrally located at the event. In this manner, the participants can actively be involved with the contest. The system can be programmed to automatically send a message back to each participant. Multiple variations of the above example are readily possible utilizing the system.

Other features and advantages of the present invention will be apparent from the following specification taken in conjunction with the following drawings.

BRIEF DESCRIPTION OF THE DRAWINGS

FIG. 3 is a partial view of the window of FIG. 2 with a selection box being opened to provide a user with a plurality of options regarding a selected message;

DETAILED DESCRIPTION OF PREFERRED EMBODIMENT

Figure 1:
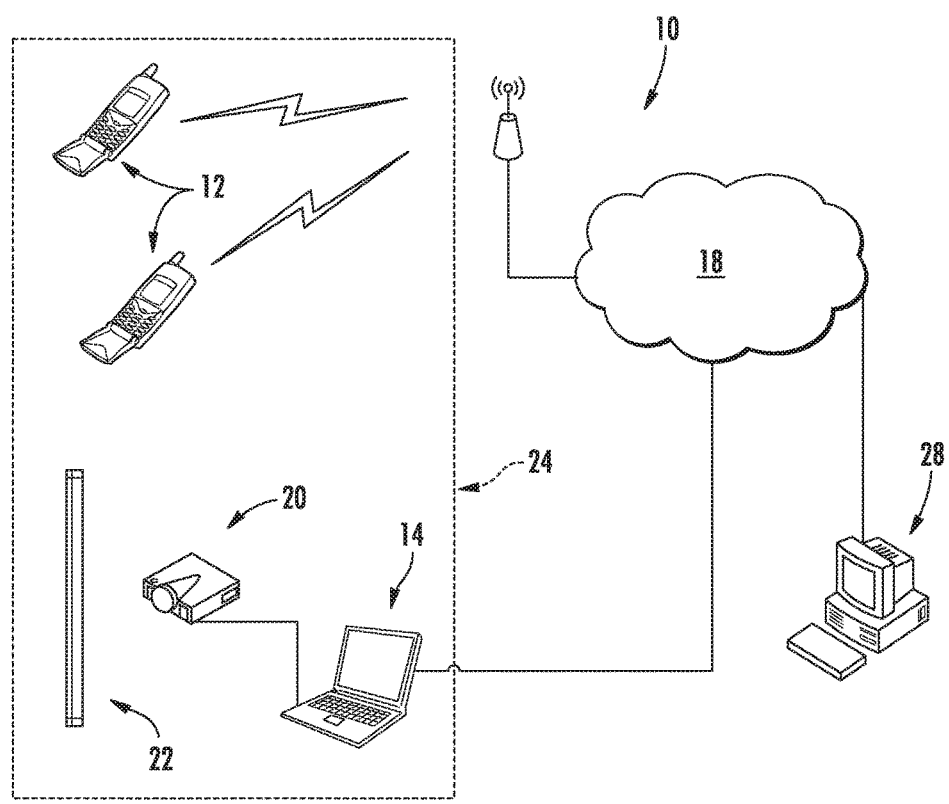
FIG. 1 is a simplified block diagram of a system in accordance with the present invention having a computer with a display.

While this invention is susceptible of embodiments in many different forms, there is shown in the drawings and will herein be described in detail a preferred embodiment of the present invention with the understanding that the present disclosure is to be considered as an exemplification of the principles of the invention and is not intended to limit the broad aspect of the present invention to the embodiment illustrated.

Turning to FIG. 1, a simplified block diagram of a system in accordance with the present invention is depicted. The system 10 includes, but is not necessarily limited to, portable electronic device(s) 12, computer 14, network 18, and display system 20.

The portable electronic device 12 can be a conventional cellular telephone capable of transmitting text messages. Accordingly, portable device 12 has a means for entering data comprising a keypad, touchpad, touch screen or the like. Portable device 12 also has a conventional wireless transceiver for transmitting the data (e.g., text messages) and receiving data (e.g., text messages) over the network 18. The network can comprise a cellular telephone network, Wi-Fi network, or other wireless network. The cellular telephone can also include a means for taking a photograph, attaching the photograph to a text message, and sending the text message with the photograph attached thereto.

In an alternative embodiment, the portable electronic device 12 is a conventional personal digital assistance (PDA), hand-held computer, pocket computer, or the like, having networking features via a cellular telephone connection, Wi-Fi connection, Bluetooth connection, wireless Ethernet connection, or other wireless connection methodology. The portable device 12 can also be a conventional pager having a keyboard or other input means.

Preferably, as indicated previously, the portable device 12 can transmit data in the form of text messages. As will be appreciated by those having ordinary skill in the art, and as used herein, text messages use short message service (SMS), enhanced messaging service (EMS), or multimedia messaging service (MMS), or the like, as the delivery mechanism for the messages. As such, the text messages sent by the portable device 12 can be stored by the network and delivered to the recipient's mobile device whenever the recipient's mobile device becomes available (i.e., connected to the network).

Accordingly, unless specifically indicated otherwise, the phrases "text messaging" and "text message" pertain to non-voice messaging (i.e., text message transfer) that commonly, but not necessarily, takes place between two or more mobile devices using SMS, EMS, MMS, or the like. In yet another embodiment, the data can be emails, instead of text messages.

The infrastructure for transferring the text messages is a conventional cellular network or system 18 having at least one cell site with portable device 12 connected thereto via a wireless link. Network 18 can use analog technology, digital technology, or both analog and digital technology. As will be understood by those having ordinary skill in the art, the digital technology can be based on CDMA (IS-95), GSM, TDMA (IS-136) or the like. Further, network 18 preferably supports text messaging, such as SMS, in a conventional manner.

In an embodiment, the data can be sent from the portable device 12 using an address comprising a telephone number or a conventional common short code or an Internet address (i.e., URL). As known by those having ordinary skill in the art, a short code has fewer digits than a 10-digit telephone number. Currently, short codes can be purchased or leased from Common Short Code Administration at usshortcodes.com or though a mobile application provider.

If a short code is to be used, the users of portable device(s) 12 are made aware of the short code by using the display system to display the short code, or through other means such as using an audible notification, a television or radio announcement, a personal address system, or the like. The users of the portable devices 12 then address text messages to the common short code number and enter text into the message. Once the users send the messages, the messages are routed through the wireless service provider's network to the SMS messaging server. The SMS messaging server then determines where to route the messages based on to which common short code the messages are addressed.

In FIG. 1, the computer 14 is a conventional device such as a laptop computer having a built in computer display screen, or a desk top computer coupled to a computer display screen. The computer 14 is connected to the network 18 and configured so the computer 14 can receive text messages from portable device(s) 12 and the computer can also send text messages to the portable device(s) over the network 18.

As such, the computer 14 can be connected to the cellular network in a conventional manner such as by using a wireless PC card modem that supports text messaging capabilities over SMS, EMS, MMS, or the like. In an alternate embodiment, the computer 14 can be connected to network 18 via a conventional telephone line, cable, or the like.

In another embodiment, the computer 14 obtains data such as text messages and pictures from a second computer 28 that is also connected to the network 18. In this embodiment, the second computer 28 initially receives the text messages and/or pictures from the portable device(s) 12 and forwards the received data to the first computer 14.

Figure 2:
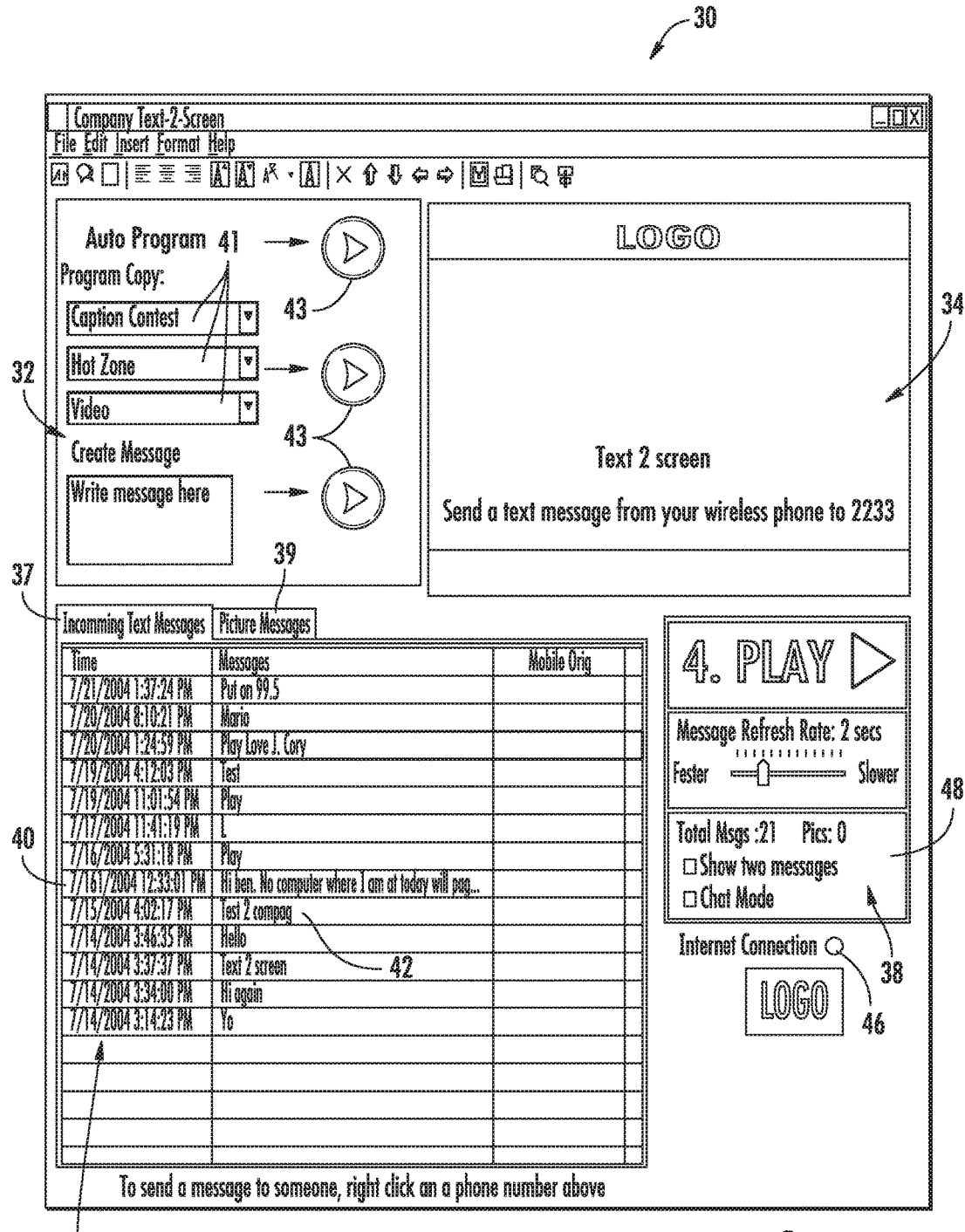
FIG. 2 is a window provided on the computer display of FIG. 1, the window having a messages received work area wherein the telephone numbers within the mobile origination.

Loaded onto the computer 14 is an application (i.e., computer program) that provides a control window 30 (FIG. 2) on the computer display. As shown in FIG. 2, the window 30 includes a program control work area 32, a preview screen work area 34, a messages received work area 36, and, a display message control area 38.

The program control work area 32 allows a user to insert items into the preview screen 34 via controls buttons, pull-down menus, or the like. Items that can be inserted into the preview screen 34 include, but should not be limited to, captions, backgrounds, video clips, pictures, advertisements, video clips of television commercials, html, flash, and the like. Further, the program control work area 32 also includes a create message text box wherein a user can enter a message that will be inserted within the preview screen 34.

In the program control work area 32, one or more combo boxes 41 are provided wherein the boxes contain pre-built templates or other items that can be selected for insertion into the preview screen 34. As indicated previously, the combo boxes 41 can contain file names of templates or other items such as, but not limited to captions, backgrounds, video clips, pictures, advertisements, and the like. Once an item is inserted within the preview screen 34, the item can be dragged to a desired location within the screen.

The program control work area 32 can also include program buttons or icons 43 wherein selecting one of the buttons causes the preview screen 32 to automatically cycle through templates stored within a background or promotion file folder. Further, selecting another program button causes the preview screen 32 to execute what has been selected within the combo boxes.

The messages received work area 36 includes a text message tab 37 and a picture message tab 39. Under the text message tab 37, recently received text messages are displayed with a date/time receipt and the mobile originator telephone number.

As shown in FIG. 2, highlighted bar 40 indicates the current position of the message to be displayed by the display system. Preferably, the most recent messages are located at the top of the list within work area 36. As explained in detail further herein, when new messages arrive, they undergo filtering and, if applicable, any filtered messages are indicated with a tag (e.g., asterisks), colored background 42, or the like. In one embodiment, if a message is filtered, then it will not be automatically displayed by the system on the display screen 22.

In addition to automatic filtering, a user of the computer 14 can also manually filter out any message by clicking on the message. As shown in FIG. 3, after clicking on the message, the user is provided with a selection box whereby the message can be replied to, deleted, or the sender can be blocked from sending messages for display. If the user selects replying to the message, the user is provided with a text message box (not shown), wherein the user can enter and send a personal reply message.

Likewise, a user of the computer 14 can also manually override any message that is filtered by the system by clicking on the message that has been filtered. As such, a user is provided with a selection box for override the filtering of the message. Thus, the filtered message will be displayed by the system.

Preferably, an automated reply message is sent by the system in response to each message received by computer 14 back to the specific portable device 12 that sent the first message to the computer. The reply message can be generated and sent by the computer 14, computer 28, the text messaging service, or the like.

Figure 4:
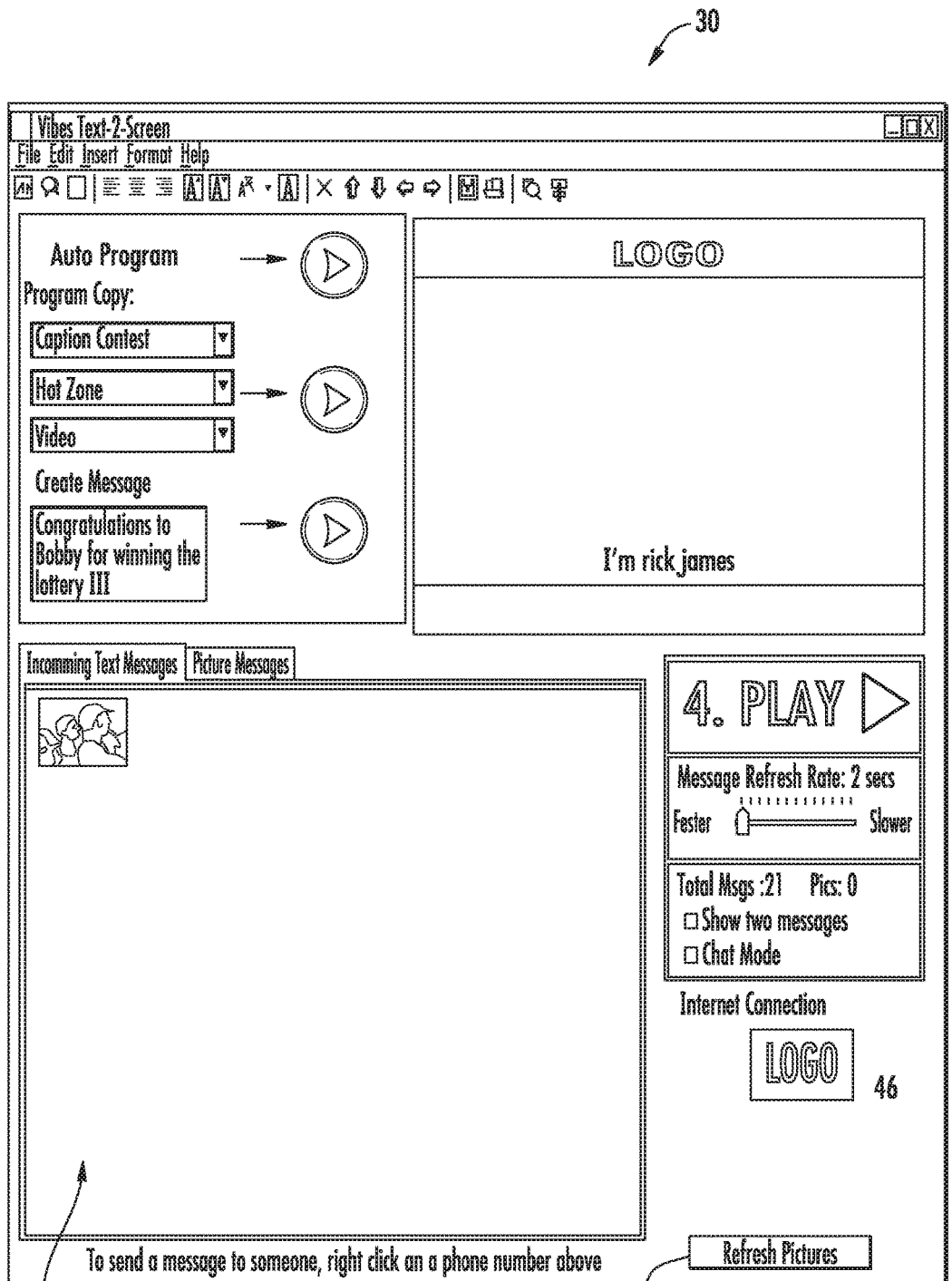
FIG. 4 is similar to FIG. 2 wherein within the messages received work area received pictures are displayed instead of the incoming text messages.

Turning to FIG. 4, by clicking on the picture message tab 37 (FIG. 2), picture messages are shown in the messages received work area 36. The pictures messages can be refreshed by clicking on a refresh button 50 that is provided when the picture message tab 37 has be selected. In addition, a total picture counter is updated within the display message control area 38. In an alternative embodiment, received pictures can be displayed in an ongoing loop wherein each picture is displayed multiple times. Moreover, the pictures can be automatically refreshed without the need for a refresh button 50 or selecting the picture message tab. Further, artificial intelligence can be used to filter through the pictures.

The pictures displayed in work area 36 are selected for placement within the preview screen 34 by clicking on the desired picture. Requiring the user to manually select the picture that is placed in the preview screen 34, instead of automatically placing the picture, allows the user of computer 14 to visually filter through the pictures (and thus remove any inappropriate or irrelevant pictures).

In one embodiment, if the picture was sent with a text message, then the text message is also provided on the preview screen 34 with the picture. Once the picture is on the preview screen 34, the user can move the picture on the screen and resize the picture by click-dragging on any corner of the image. Further, by right clicking the image, the user can be provided with a menu pop-up box (not shown) for rotating the image, adjusting the color of the image, and the like.

Turning back to FIG. 2, the display message control area 38 includes a play button, a message rate slider bar, a "show two messages" select box, and a "chat mode" select box. Selecting the play button results in the computer 14 causing the display system 20 to visually display what is on the preview screen 34 at the time the play button was selected.

The message rate slider within control area 38 allows a user to select the rate at which incoming messages are displayed. In one embodiment, the fastest rate the messages are displayed is about as fast as they can be read. Further, the slowest rate the messages can be displayed is a rate wherein the currently displayed message is never changed.

In one embodiment, the computer 14 (FIG. 1) receives data (i.e., text messages and photographs) over the Internet. As such, an Internet connection status indicator 46 can be included within control area 38. A red indicator can be used to indicate an Internet connection cannot be established. Likewise, a green indicator can indicate an Internet connection is established. Moreover, the display message control area 38 can also include a message count indicator wherein the total number of messages and pictures are displayed.

In FIG. 2, the "show two messages" selection box within control area 38 allows the user to select if two messages are to be displayed together by the display system 20. In an embodiment, the two messages can be displayed wherein one message is displayed above the other message, and both messages are contained within separate box-like borders. In a further embodiment, more than two messages can be displayed such as three, four, or more.

Also in FIG. 2, the "chat mode" selection box within control area 38 allows the user to select if two or more messages are to be displayed together by the display system 20. In a preferred embodiment, selecting "chat mode" causes four messages to be displayed wherein each message is contained within a differently colored-filled box. Moreover, in "chat mode" four digits are shown with each message wherein the digits represent the last digits of the phone number or other identification associated the sender of the message.

Control area 38 can also include a new picture indicator 48 comprising a colored flashing icon or other indicator. The purpose of the indicator 48 is to alert the user when additional pictures have been received. In one embodiment, the pictures are initially received and downloaded from a server or other computer 28 connected to network 18. As such, the pictures are downloaded when the user selects the refresh pictures button 50 (FIG. 4).

As indicated previously, the application loaded on the computer 14 (FIG. 1) can include a filter module or program wherein each text message received by the computer is checked against a list of words contained in a database stored in the computer memory.

The words within the database can be edited (i.e., added or deleted) by the user of the computer. Moreover, the database can also contain character strings having wildcard characters that stand for one or more characters. For example, an asterisk (*) in a character string can stand for any combination of letters. Thus, if the character string "pent" is in the database, then a message containing the word "patent" will be filtered.

When a text message contains at least one word in the database, the user is provided with a visual or audible notification or tag such as the message being highlighted as shown by shaded background 42 in FIG. 2 (the highlighting can be any color supported by the computer display). The tag can be removed by the user clicking the message, wherein the message will be displayed via the display system 20 with the other messages received. Alternatively, the user can have the message automatically deleted.

Referring to FIG. 1, the display system 20 is operatively connected to computer 14. Display system 20 can include a display screen 22 wherein the text messages received by computer 14 are shown on the display screen. As explained previously, the text messages are shown sequentially, wherein each message is shown for a predetermined period of time that can be set by the user via the application on the computer 14. The display system can comprise, for example, a projector and screen, a projection television, a projection monitor, a cathode ray tube display, a liquid crystal display, a plasma display, an array of light bulbs or light emitting diodes. The display screen of the system can be positioned to allow participants to view the screen during the event. For example, the screen can be centrally located in a bar or restaurant, mounted near a disc jockey or band, or positioned above a court in an arena.

The system described herein can be used during events to promote goods or services. For example, the system can be used at a bar, restaurant, sporting event, concert, movie-theater, outdoor billboard having a display, or the like for promoting a beverage. As such, the image provided by display system 20 can include the text message and an advertisement, logo, or other promotional indicia. The image can also include video clips, photos, or other entertaining segments.

Components of the system can be mobile such as, but not necessarily limited to, computer 14 and display system 20. This allows for the control and display of the text messages at an event or venue 24 that may last for a short period of time such as one day or evening. Accordingly, the mobile components can be provided where needed at the venue 24, such as near a disc jockey or a band, in a bar, at a restaurant, at a concert, at a sporting event, in a parking lot of a facility hosting an event. Therefore, the user can directly observe the event while controlling the text messages and other information displayed on the display screen 22.

As a result of a suitable viewing venue being located outside, it may be desirable to provide the display system 20 on a large mobile platform. For instance, the display system 20, and in particular the screen 22, can be mounted to a truck, tractor-trailer, or other large mobile platform.

Figure 5:
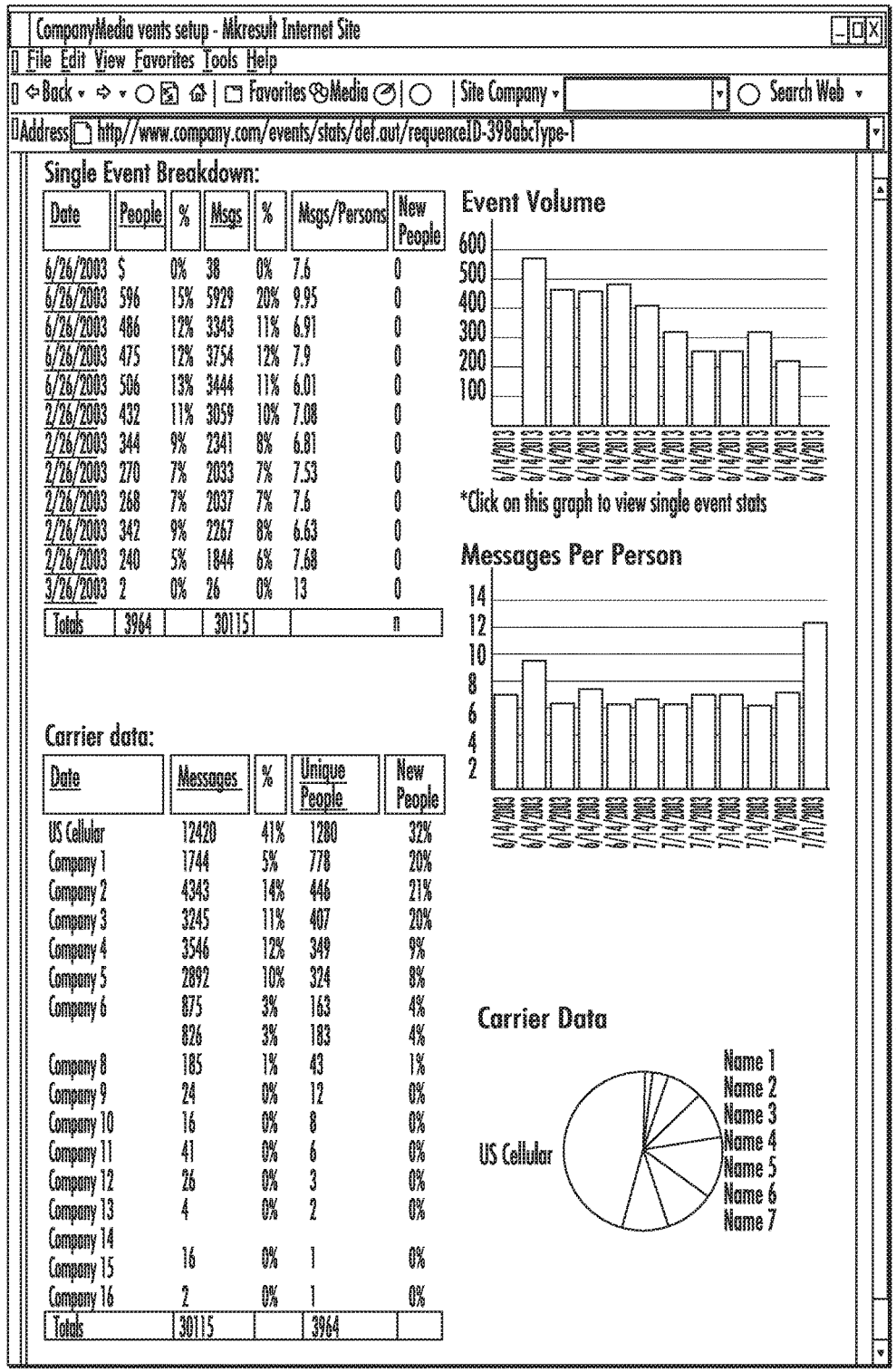
FIG. 5 is a statistics page generated by the system of FIG. 1.
Figure 6:
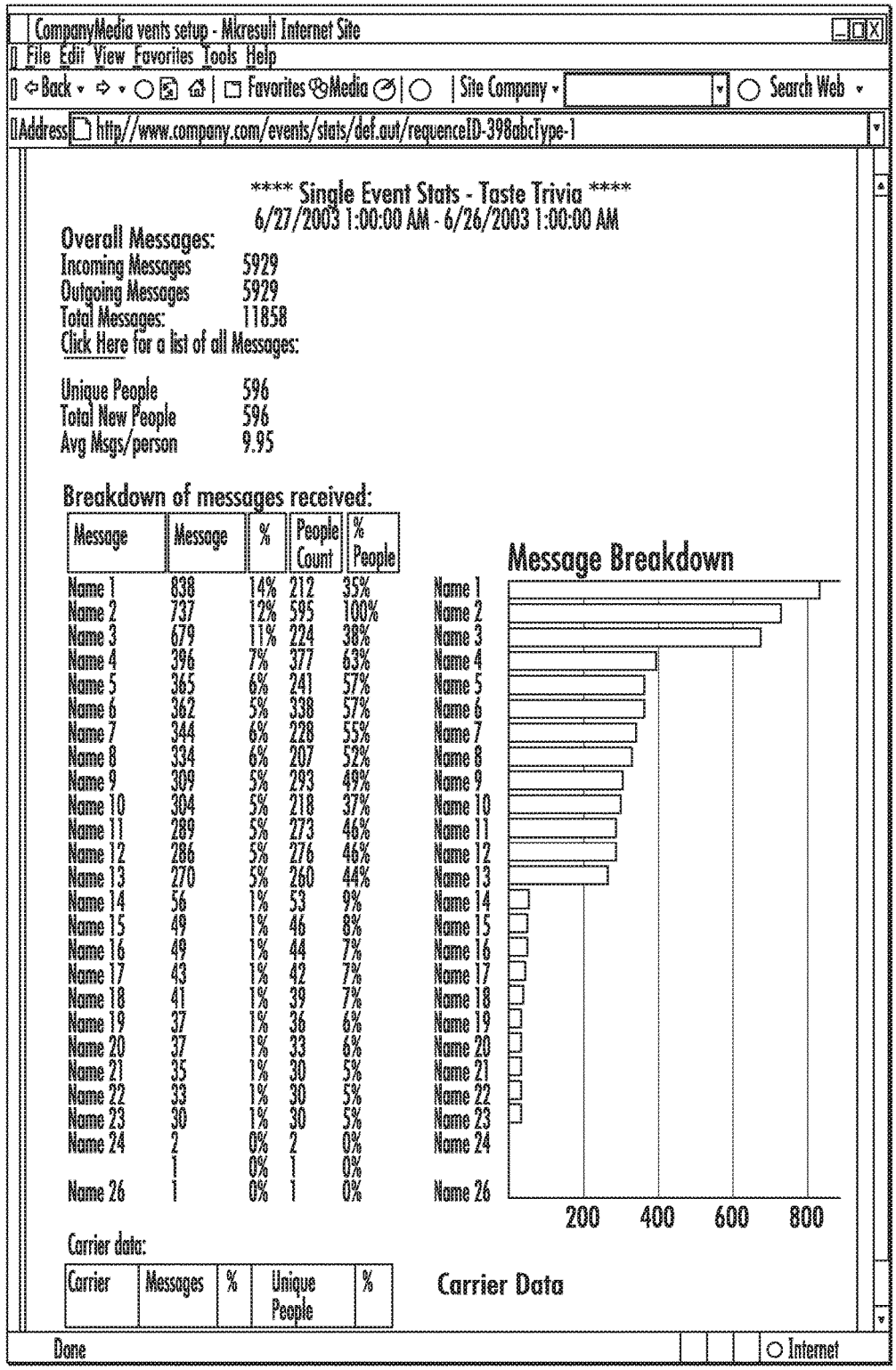
FIG. 6 is another statistics page generated by the system of FIG. 1.

If desired, computer 28 can collect statistical data regarding text messages sent during one or more events. The computer 28 can generate web pages 52 (FIGS. 5 and 6) with the statistical data shown in charts, graphs, and the like. In an embodiment, the web pages can be accessed by another authorized computer over the Internet.

While the specific embodiments have been illustrated and described, numerous modifications come to mind without significantly departing from the spirit of the invention, and the scope of protection is only limited by the scope of the accompanying Claims.

What is claimed is:

1. A system for displaying data comprising:
    a portable device comprising an input means for entering text message data and a wireless transceiver for transmitting the text message data, via a short message service, and receiving messages, the text message data comprising an original first message containing at least one prohibited word and an original second message containing at least one non-prohibited word;
    a computer comprising an application and a first display screen, the application comprising a filter that checks the text message data against a list comprising said at least one prohibited word and provides an indication on the first display that the text message data contains said at least one prohibited word, wherein text message data containing said at least one prohibited word can be approved for display on a second display screen; and
    a display system operatively coupled to the computer and comprising the second display screen mounted in a public forum wherein filtered data comprising the original second message is automatically displayed on the second display screen for a predetermined period of time and the original first message is not automatically displayed on the second display screen.

2. The system of claim 1 wherein the portable device is a cellular telephone.

3. The system of claim 1, wherein a network is operatively connected to the portable device.

4. The system of claim 1, wherein the display screen is mounted within a bar wherein patrons of the bar can view the display screen.

5. The system of claim 1 wherein an advertisement is displayed on the second display screen with the filtered data comprising the text message data.

6. The system of claim 1 wherein text messages are prevented from being automatically displayed if they contain one or more words on the list.

7. The system of claim 1 wherein text messages are tagged if they contain one or more words on the list.

8. The system of claim 1 wherein the text message data within the original first message is filtered again after the filter checks the text message data.

9. A method comprising the steps of:
    receiving, via a short message service, text message data from a portable device having an input means for entering the text message data and a wireless transceiver for transmitting the text message data and receiving text messages, the text message data comprising an original first message containing at least one prohibited word and an original second message containing at least one non-prohibited word;
    filtering the text message data with a computer comprising an application and a first display, the application comprising a filter program that checks the text message data against a list comprising said at least one prohibited word and provides an indication on the first display that the text message data contains said at least one prohibited word, wherein text message data containing said at least one prohibited word can be approved for display on a second display screen;

displaying filtered data comprising the text message data comprising the at least one word via a display system connected to the computer, the display system comprising a second display screen mounted in a public forum wherein the original second message is automatically displayed on the second display screen for a predetermined period of time and the original first message is not automatically displayed on the second display screen.

10. The method of claim 9 further comprising the steps of:
transmitting the data from the portable device to the computer via a network operatively connected to the portable device and the computer.

11. The method of claim 9 further comprising the steps of:
receiving data from a plurality of portable devices;
filtering the data from each additional device; and,
displaying the filtered data on the second display screen.

12. The method of claim 9 wherein the portable device is a cellular phone.

13. The method of claim 9 wherein the portable device is a personal digital assistant (PDA).

14. The method of claim 9 wherein the second display screen is a projection screen.

15. The method of claim 9 further comprising the step of displaying an advertisement on the second display screen with the filtered data.

16. The method of claim 9 further comprising the step of preventing a text message from being automatically displayed on the second display screen if one or more words in the text message match at least one or more words on the list.

17. The method of claim 9 further comprising the step of tagging a text message if the message contains a word on the list.

18. The method of claim 9 wherein the text message data within the original first message is filtered again after the step of filtering the text message data.

* * * * *